United States Patent [19]
Fukumura

[11] Patent Number: 6,015,192
[45] Date of Patent: Jan. 18, 2000

[54] SYSTEM FOR ESTIMATING VEHICLE BODY SPEED AND ROAD SURFACE FRICTION COEFFICIENT

[75] Inventor: Tomohiro Fukumura, Kanagawa, Japan

[73] Assignee: Nissan Motor Co., Ltd., Yokohama, Japan

[21] Appl. No.: 08/886,143

[22] Filed: Jun. 30, 1997

[30] Foreign Application Priority Data

Jul. 18, 1996 [JP] Japan ................................... 8-189399

[51] Int. Cl.[7] ........................................................ B60T 8/24
[52] U.S. Cl. ............................ 303/140; 303/150; 701/80
[58] Field of Search ................................ 303/198, 189, 303/150, 140; 701/73, 80, 72, 71; 702/142

[56] References Cited

U.S. PATENT DOCUMENTS

| | | | |
|---|---|---|---|
| 4,779,447 | 10/1988 | Rath | 303/198 |
| 5,390,991 | 2/1995 | Tozu et al. | 303/198 |
| 5,505,532 | 4/1996 | Tozu et al. | 303/198 |
| 5,676,434 | 10/1997 | Ichikawa et al. | 303/150 |
| 5,711,024 | 1/1998 | Wanke | 303/150 |
| 5,723,768 | 3/1998 | Ammon | 73/8 |
| 5,774,821 | 6/1998 | Eckert | 303/189 |

FOREIGN PATENT DOCUMENTS

| | | |
|---|---|---|
| 43 29 745 C1 | 7/1994 | Germany . |
| 6-286630 | 10/1994 | Japan . |
| 7-101258 | 4/1995 | Japan . |
| 7-132787 | 5/1995 | Japan . |

Primary Examiner—Mark T. Le
Assistant Examiner—Thomas J. Williams
Attorney, Agent, or Firm—Foley & Lardner

[57] ABSTRACT

A system for a wheeled vehicle includes sensors for determining wheel speed, wheel load and wheel longitudinal driving or braking force of each wheel, and an estimating or controlling unit for estimating a vehicle body speed and/or a road surface friction coefficient from sensor output signals. The estimating unit determines a coordinate pair of a wheel speed value and a longitudinal force coefficient value for each wheel, and plots the coordinate pairs of the individual wheels as a set of points in a plane rectangular coordinate axis. The unit determines a regression line closely fit to the point set and obtains the estimates of the vehicle body speed and friction coefficient from the intercept of the regression line on the coordinate axis of the wheel speed and the slope of the regression line.

23 Claims, 9 Drawing Sheets

SYSTEM FOR ESTIMATING VEHICLE BODY SPEED AND ROAD SURFACE FRICTION COEFFICIENT

BACKGROUND OF THE INVENTION

The present invention relates to a system and a process for estimating a vehicle body speed and/or a road surface friction coefficient of a wheeled vehicle.

Estimation of vehicle body speed and road surface friction coefficient is required in a anti-skid brake control system (or wheel slip brake control system) for automatically controlling the braking force to prevent wheel locking on braking, a traction control system for preventing the spinning of drive wheels due to excess driving power and a vehicle directional behavior control system for reducing a deviation of an actual vehicle motion variable such as a vehicle yaw rate from a desired value by controlling the braking forces of left and right wheels individually. The following are some conventional examples for estimating the vehicle body speed or friction condition. Some are put to practical use.

As to the estimation of the vehicle body speed, there are at least three conventional examples.

The first conventional example is often used in a traction control system for a two wheel drive vehicle. The non-driving wheels of the two wheel drive vehicle are exempt from acceleration slip (or driving slip). Therefore, this conventional example regards the wheel speed of the non-driving wheels as the vehicle body speed during the traction control operation.

The second conventional example is for an anti-skid brake control system. The system first eliminates a slip by temporarily removing the braking force of a specified wheel and then takes the wheel speed of the specified wheel as the vehicle body speed.

The third conventional example is arranged to sense the longitudinal acceleration of the vehicle, and determine the vehicle body speed by integrating the sensed longitudinal acceleration.

As to the estimation of the friction coefficient, there are known three conventional examples.

The first conventional example is disclosed in Japanese Patent Provisional Publication No. 7-132787. This system applies a light braking force on a specified wheel to detect a relationship between the braking force and slip during the light braking, and estimates the road surface friction coefficient by predicting a variation characteristic of the friction coefficient with respect to the slip rate.

The second conventional example is disclosed in Japanese Patent Provisional Publication No. 6-286630. This system is arranged to determine a relationship between the road surface friction coefficient and a certain sensed variable strongly correlated to the friction coefficient by learning with a neural network, and estimate the friction coefficient from the sensed variable during movement of the vehicle.

The third conventional example is disclosed in Japanese Patent Provisional Publication No. 7-101258. This system is arranged to determine a driving torque difference between the left and right drive wheels from a differential limiting torque of a limited slip differential, and to estimate the road friction coefficient according to a predicted characteristic of the road surface friction coefficient with respect to the slip rate, predicted from the torque difference and a wheel speed difference between the left and right drive wheels.

However, the first conventional vehicle body speed estimating technique is not applicable to a four wheel drive vehicle having no non-driving wheels. Moreover, this technique is unable to estimate the vehicle body speed during braking because the brakes are applied to all the wheels and none of the wheel speeds represents the vehicle body speed.

In the second conventional body speed estimating technique, the removal of the braking force to the specified wheel tend to incur undesired hunting and make the estimate of vehicle body speed unstable. As a result, the anti-skid control based on the estimate is less stable, and the control accuracy is poorer.

In the third conventional body speed estimating technique, a drift of the G sensor for sensing the vehicle longitudinal acceleration lowers the accuracy of the vehicle body speed estimation, and the road surface inclination exerts undesirable influence on the output of the G sensor.

The first conventional friction estimating technique is unable to estimate the friction coefficient during brake application to all the wheels due to lack of ability of predicting a variation of the road friction coefficient with respect to the slip rate.

The second conventional friction estimating technique requires a long time for the learning operation of the neural network and the design of the neural network architecture is not easy.

The third conventional friction estimating technique is incompetent for estimation of the friction coefficient during braking, and hence the application is limited. This technique takes no account of load transfer during vehicle motion, and this affects the estimation accuracy.

SUMMARY OF THE INVENTION

It is therefore an object of the present invention to provide new estimating system and process of wider application and higher accuracy.

According to the present invention, a system for estimating an unknown vehicle operating variable such as a vehicle body speed or a road surface friction parameter includes at least a sensor group and an estimating unit or controller. The sensor group is for sensing vehicle operating conditions required to determine values of a wheel speed, a wheel load and a wheel longitudinal driving or braking force of each of monitored wheels which are at least two of road wheels of the vehicle. The estimating unit or controller is for estimating the vehicle operating variable from the wheel speed, load and longitudinal force.

This estimating system is applicable no matter whether 2WD or 4WD. This estimating system can always function properly whether the brake is applied or not. This system can improve the accuracy and stability in estimation and vehicle control by eliminating the need for temporal braking operation or temporal releasing operation. This system is advantageous in estimating speed and structure as compared to the neural network technique.

DETAILED DESCRIPTION OF THE INVENTION

Figure 1:
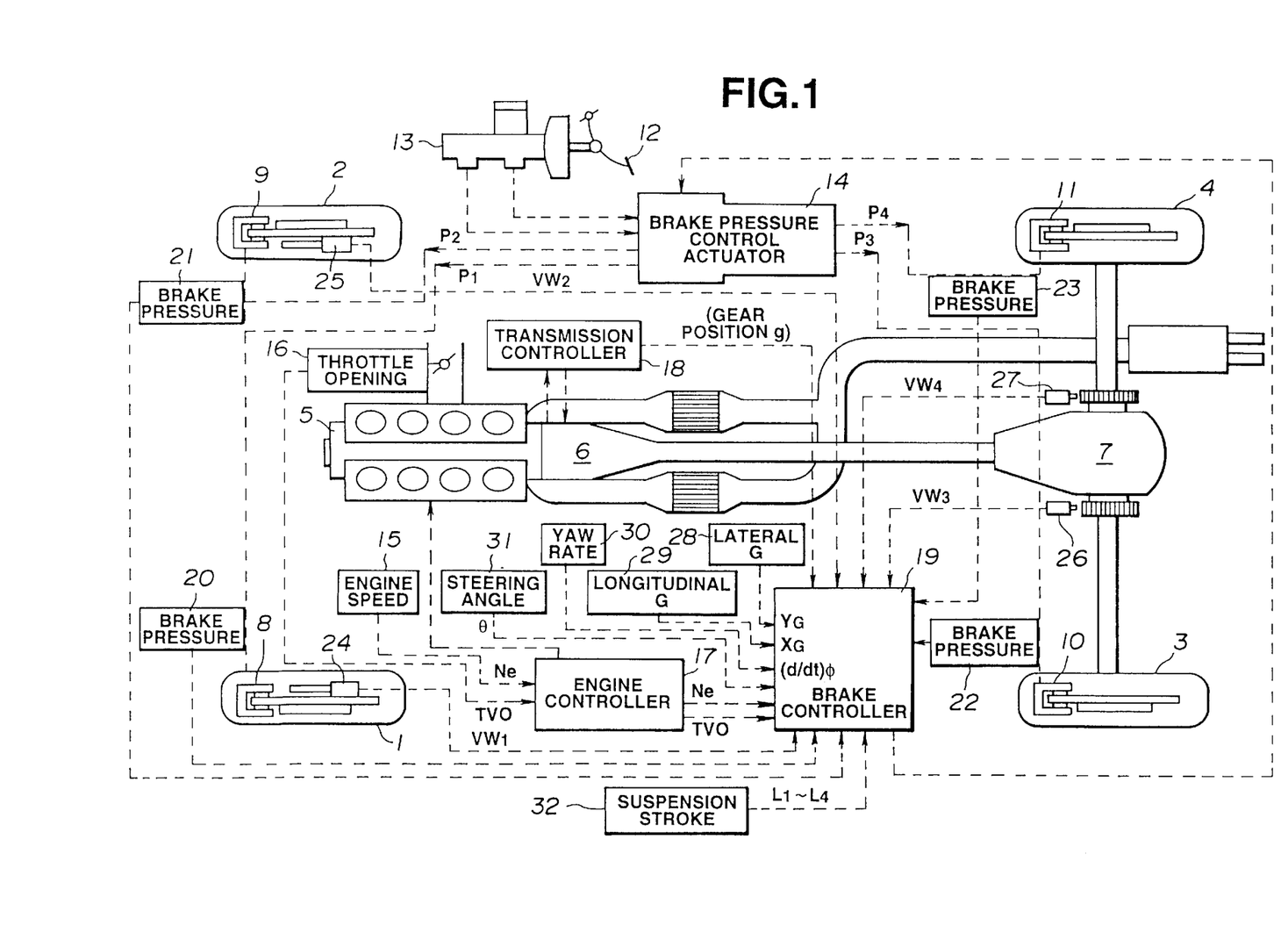
FIG. 1 is a schematic view showing a vehicle equipped with a brake control system including an estimating system according to one embodiment of the present invention.

FIG. 1 shows a vehicle operating variable estimating system according to one embodiment of the present invention. In this embodiment, the estimating system is incorporated in a brake control system for a vehicle.

A vehicle shown in FIG. 1 comprises a set of road wheels, a power or drive system, a brake system and a suspension system.

The wheel set of this example includes left and right front wheels 1 and 2 and left and right rear wheels 3 and 4.

The power system of the vehicle includes at least an engine 5, an automatic transmission 6 and a differential 7 of a type having no differential limiting function. Power from the engine 5 is transmitted through the transmission 6 and the differential 7 to the rear wheels 3 and 4. In this example, the rear wheels 3 and 4 are driving wheels, and the front wheels 1 and 2 are non-driving wheels on a non-powered axle.

The brake system of this example is a hydraulic brake system including four wheel cylinders 8~11 each provided for a unique one of the four road wheels 1~4. In accordance with a driver's pedal effort on a brake pedal 12, a brake master cylinder 13 displaces brake hydraulic fluid under pressure to a brake fluid pressure control actuator (or hydraulic modulator) 14. The brake fluid pressure control actuator 14 supplies a brake fluid pressure with or without pressure modulation to each wheel cylinder 8~11. In the example shown in FIG. 1, the brake fluid pressure control actuator 14 has four outlet ports respectively and individually connected to the four wheel cylinders 8~11.

An engine speed sensor (or engine revolution sensor) 15 senses an engine speed Ne (in terms of the number of revolutions per unit time). A throttle position sensor 16 senses an engine throttle opening (degree) TVO. An engine controller 17 controls the engine 5 in accordance with engine and vehicle operating conditions sensed by a sensor group including the engine speed sensor 15 and the throttle position sensor 16. The vehicle of this example further includes a transmission controller 18 for controlling the automatic transmission 6 in accordance with various input information items.

A brake controller 19 shown in FIG. 1 controls individual brake fluid pressures P1~P4 destined for the wheel cylinders 8~11 by controlling the brake fluid pressure control actuator 14. In addition, the brake controller 19 estimates an unknown vehicle operating variable such as a vehicle body speed Vx(now) and a road surface friction coefficient $\mu$ for a wheel slip brake control (or anti-skid brake control). In this example, the brake controller 19 can serve as an estimating unit, and the brake fluid pressure control actuator 14 can serve as a vehicle control actuator for controlling a behavior of the vehicle in response to a control signal of the brake controller 19.

Brake fluid pressure sensors 20~23 sense the respective brake fluid pressures $P_1$~$P_4$ supplied to the wheel cylinders 8~11. In this example, the brake fluid pressure sensors 20~23 serve as brake sensors for sensing individual braking conditions of the wheels 1~4.

Wheel speed sensors 24~27 sense the wheel speeds $VW_1$~$VW_4$ of the respective wheels 1~4.

Signals from these sensors 20~23 and 24~27 are inputted to the brake controller 19. The brake controller 19 further receives the signals indicative of the engine speed Ne and the throttle opening TVO from the engine controller 17, and a transmission condition signal indicative of a selected gear position g from the transmission controller 18. These components supply information on actual operating conditions of the vehicle's drive or power system inclusive of the engine 5, to the brake controller 19, and can serve as a drive system condition sensor.

Lateral acceleration sensor 28, longitudinal acceleration sensor 29 and yaw rate sensor 30 are mounted at the center of gravity of the vehicle body, and arranged to sense lateral acceleration $Y_G$, longitudinal acceleration $X_G$ and yaw rate $(d/dt)\phi$ of the vehicle. The sensed vehicle motion variables $Y_G$, $X_G$ and $(d/dt)\phi$ are inputted to the brake controller 19.

A steering angle sensor 31 senses a steering wheel angle $\theta$ and supplies the sensed angle $\theta$ to the brake controller 19.

Suspension stroke sensors 32 sense suspension stroke quantities $L_1$~$L_4$ of the four wheels 1~4, and supplies the sensed stroke quantities $L_1$~$L_4$ to the brake controller 19. These sensors 32 serve as suspension condition sensors for sensing individual suspension conditions ($L_1$~$L_4$) of the four wheels 1~4.

In response to these input data items, the brake controller 19 performs a program of FIG. 2 for estimating the vehicle body speed Vx(now) and the road surface friction coefficient μ, and further performs a wheel slip control procedure as mentioned later in accordance with the results of the estimation.

Figure 2:
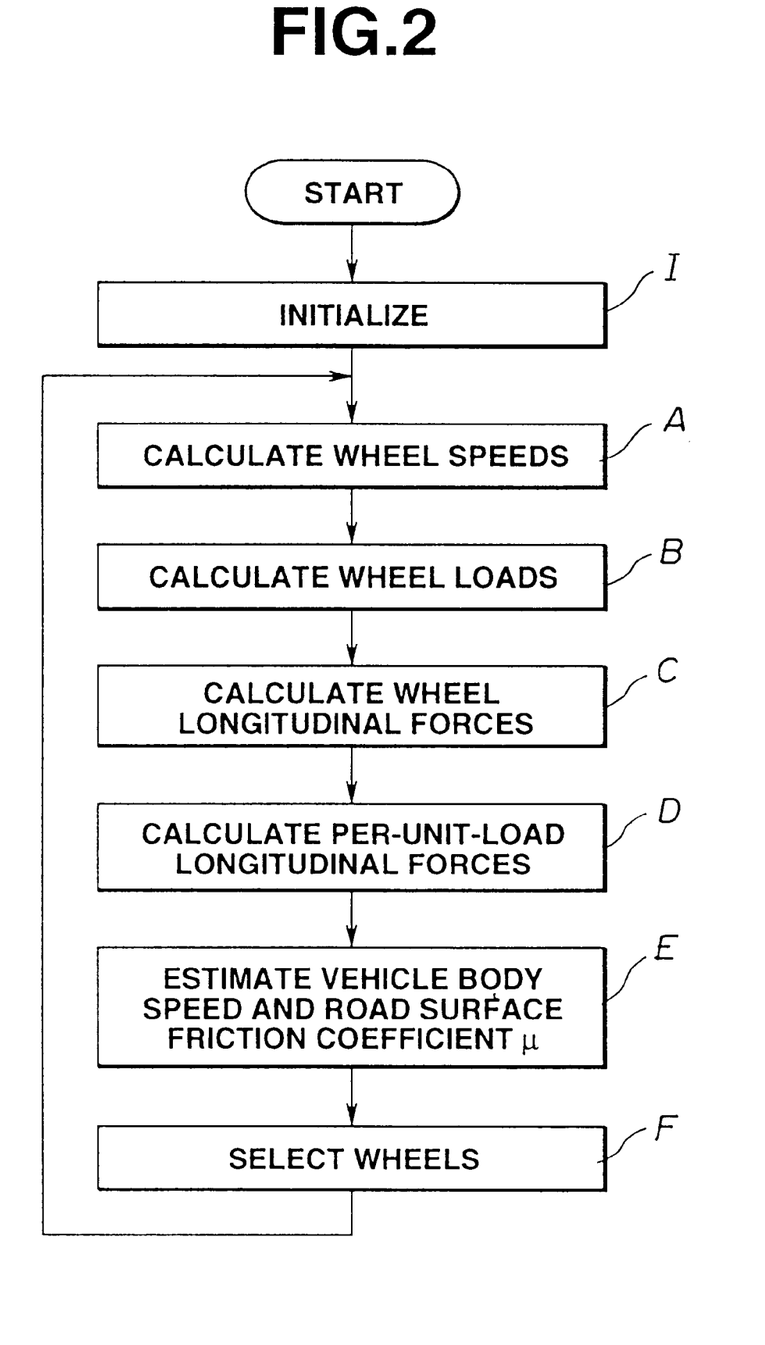
FIG. 2 is a flowchart showing an estimating process carried out by an brake controller in the estimating system shown in FIG. 1.

The estimation of FIG. 2 is based on the following principle.

Figure 3A:
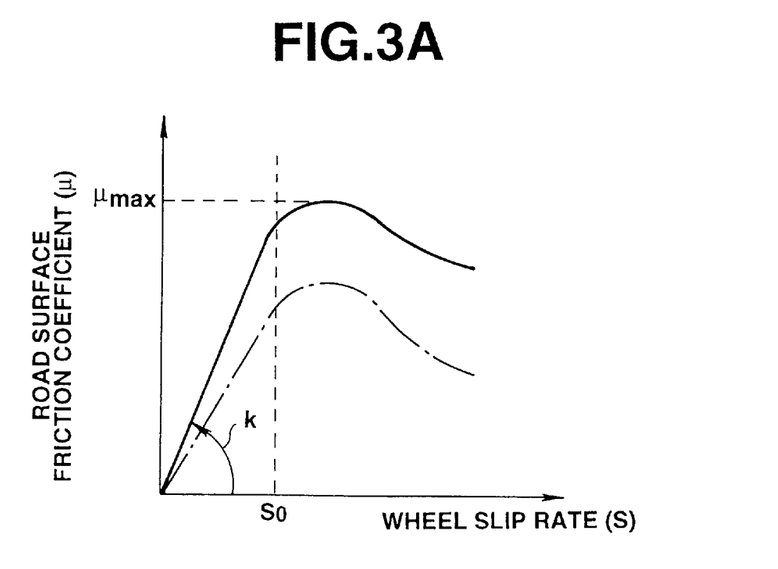
FIG. 3A is a graph showing a characteristic of a road surface friction coefficient with respect to a wheel slip rate, and a predetermined slip rate value So used in the embodiment.

As shown in FIG. 3A, the road friction coefficient μ (i.e., the wheel's longitudinal braking or driving force) varies in dependence on the wheel slip rate S as shown by a solid line on a high friction road surface, and as shown by a one dot chain line on a low friction surface. Despite a conspicuous difference in maximum $\mu_{max}$, both characteristics have similar tendencies.

This relationship holds valid in a braking region where S≧−So as well as in an accelerating region where S≦So, as known in the art.

Figure 3B:
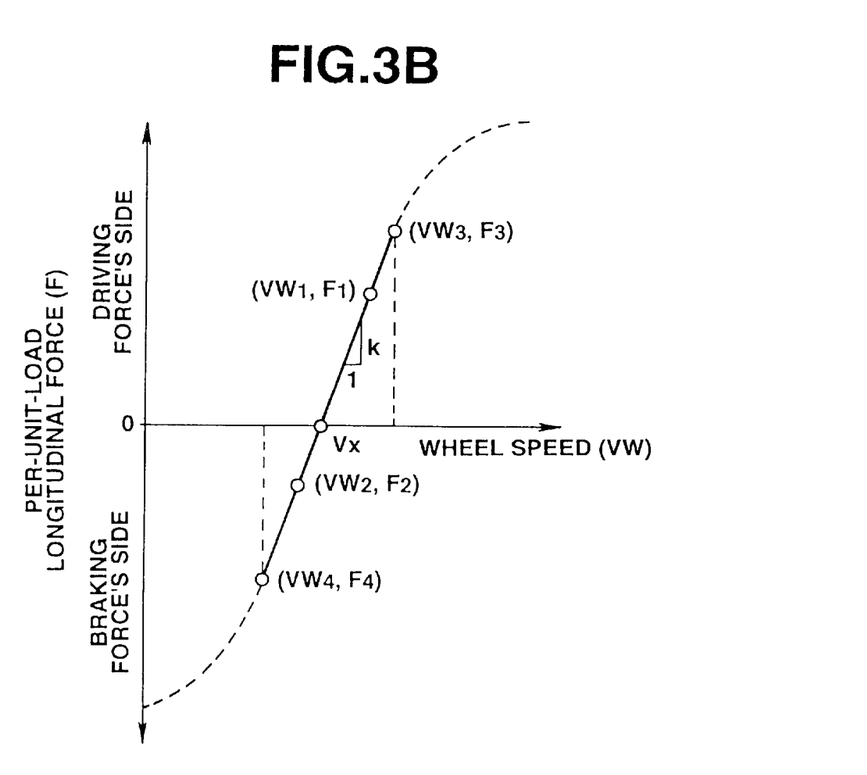
FIG. 3B is a graph illustrating an analysis of numerical data for estimating a vehicle body speed and a friction coefficient according to the embodiment of the present invention.

FIG. 3B shows a two dimensional rectangular coordinate system having a horizontal axis representing a wheel speed VW and a vertical axis representing a longitudinal (braking or driving) force F per unit wheel load. The data pair (or coordinate pair) of the wheel speed $VW_1$~$VW_4$ and the per-unit-load longitudinal force $F_1$~$F_4$ of each wheel 1~4 determines the position of a point in a plane defined by this coordinate system. In FIG. 3B, there are four of the points plotted by the four coordinate pairs of the four wheels 1~4. In a region where the wheel slip rate S is equal to or smaller than a predetermined slip rate value So and the relationship between the friction coefficient and slip rate can be safely regarded as linear, these four points approximately collinear and lie on, or closely near, a straight line shown by a solid line in FIG. 3B.

This straight line intersects the horizontal axis or wheel speed (VW) axis of the plane coordinate system at an intercept point. The intercept of the straight line on the horizontal axis represents a vehicle body speed Vx. On the other hand, the straight line is inclined, and the gradient of the straight line with respect to the horizontal wheel speed (VW) axis represents a driving stiffness k of the vehicle. The driving stiffness k corresponds to the gradient of the rise of the road surface friction coefficient μ with respect to the horizontal slip rate (S) axis of FIG. 3A.

Figure 4:
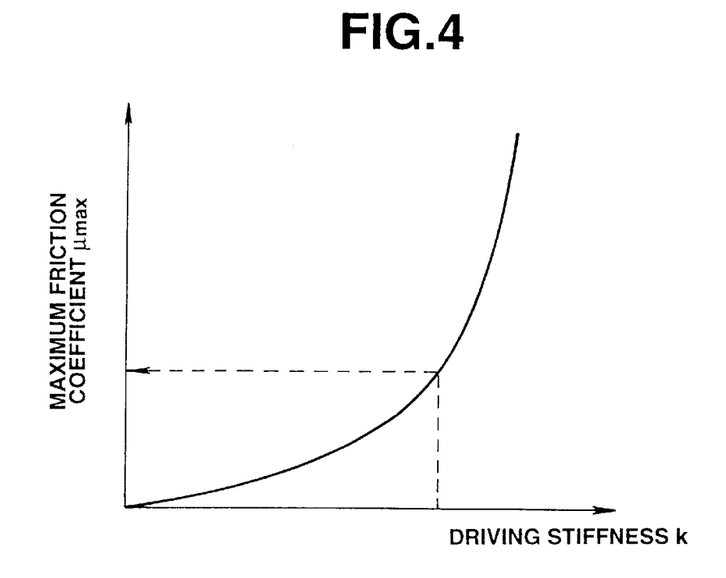
FIG. 4 is a graph showing a relationship between a driving stiffness and a maximum road surface friction coefficient, used in the embodiment.

Comparison between the solid line curve and two dot chain line curve in FIG. 3A shows that there exists a relationship between the driving stiffness k and the maximum road surface friction coefficient $\mu_{max}$ as shown in FIG. 4. The maximum road surface friction coefficient $\mu_{max}$ is a parameter indicating the absolute degree of difficulty of (or resistance against) slippage on a road surface. (Hereinafter, the maximum road surface friction coefficient $\mu_{max}$ is also called a friction coefficient μ.)

From the gradient or slope (i.e. the driving stiffness k) of the inclined straight line of FIG. 3B with respect to the wheel speed (VW) axis, it is possible to estimate the friction coefficient μ indicative of the absolute degree of friction (or difficulty of slippage).

Therefore, the estimating system according to this embodiment first determines the coordinate pair of the wheel speed $VW_1$~$VW_4$ and per-unit-load longitudinal force $F_1$~$F_4$ for each wheel which remains in the linearity region where the degree of slip is relatively small; then finds a straight line (or regression line) representative of points corresponding to the determined coordinate pairs in the plane coordinate system as shown in FIG. 3B; and finally estimates the vehicle body speed Vx and the road surface friction coefficient μ in the above-mentioned manner.

The program of FIG. 2 shows a process for estimating the vehicle body speed Vx and the friction coefficient μ. The estimating system starts executing the estimating program at a start of the engine 5. The estimating system first performs a step I for initialization, and then repeats a cycle of process steps A~F.

Step A

The first process step A is a process or program section for calculating the individual wheel speeds of the four wheels 1~4. The wheel speed determining step A of this example evaluates the wheel speed of each wheel by the following first and second sub-steps or operations A1 and A2.

A1. Reading of Sensed Wheel Speeds

The brake controller (or estimating unit) 19 of the estimating system reads the sensed individual wheel speed values $VW_1$~$VW_4$ supplied from the wheel speed sensors 24~27 for the four wheels 1~4.

A2. Filtration of Sensed Wheel Speeds

The brake controller 19 determines filtered wheel speed values $VW_{f1}$~$VW_{f4}$ by passing the sensed wheel speed values $VW_1$~$VW_4$ through a filter of first order lag to remove noise. The filtered wheel speed values $VW_{fi}$ are given by;

$$VW_{fi}=[1/(1+Tw\cdot s)]VW_i \qquad (1)$$

where i is any whole number from 1 to 4, Tw is a time constant of the first order lag, and s is a Laplace operator (or a complex variable used in the Laplace transform).

Step B

The estimating system computes the individual vertical wheel loads $W_1$~$W_4$ of the vehicle wheels 1~4 by the following four sub-steps B1~B4.

B1. Reading of Sensed Lateral and Longitudinal Accelerations

The brake controller 19 reads the sensed lateral acceleration $Y_G$ and the sensed longitudinal acceleration $X_G$ from the sensors 28 and 29.

B2. Filtration of Sensed Lateral and Longitudinal Accelerations

This sub-step includes filtering operations for determining filtered lateral and longitudinal accelerations $Y_{Gf}$ and $X_{Gf}$ by passing the sensed lateral and longitudinal accelerations $Y_G$ and $X_G$, respectively, through filters of first order lag, designed to take consideration of a delay in load transfer due to suspension strokes. The filtered lateral and longitudinal accelerations $Y_{Gf}$ and $X_{Gf}$ are expressed as;

$$Y_{Gf}=[1/(1+T_Y\cdot s)]Y_G \qquad (2)$$

$$X_{Gf}=[1/(1+T_X\cdot s)]X_G \qquad (3)$$

where $T_Y$ is a time constant of the first order lag for the lateral acceleration, $T_X$ is a time constant of the first order lag for the longitudinal acceleration, and s is the Laplace operator.

B3. Calculation of Load Transfer Quantities

This sub-step calculates load variations $\Delta W_1$~$\Delta W_4$ from the filtered lateral acceleration $Y_{Gf}$ and the filtered longitudinal acceleration $X_{Gf}$ according to the following equations.

$$\Delta W_1=K_x\cdot X_{Gf}-K_{YF}\cdot Y_{Gf} \qquad (4)$$

$$\Delta W_2=K_x\cdot X_{Gf}+K_{YF}\cdot Y_{Gf} \qquad (5)$$

$$\Delta W_3=-K_x\cdot X_{Gf}-K_{YR}\cdot Y_{Gf} \qquad (6)$$

$$\Delta W_4=-K_x\cdot X_{Gf}+K_{YR}\cdot Y_{Gf} \qquad (7)$$

where $K_x$, $K_{YF}$ and $K_{YR}$ are constants determined by the wheel base, height of the center of gravity, tread and roll stiffness distribution of the vehicle.

B4. Calculation of Individual Wheel Loads

This sub-step is for determining the individual wheel loads $W_1 \sim W_4$ of the four wheels 1~4 according to the following equations (8) by using initial wheel loads $W0_1 \sim W0_4$ preliminarily stored in a memory section, and the individual load variations $\Delta W_1 \sim \Delta W_4$.

$$W_i = W0_i + \Delta W_i \quad (8)$$

where i is any whole number from 1 to 4.

Step C

The step C is a program section for determining the longitudinal driving or braking forces of the four wheels 1~4 by the following twelve sub-steps C1~C12.

C1. Reading of Sensed Wheel Speeds

The brake controller 19 reads the sensed individual wheel speeds $VW_1 \sim VW_4$ from the wheel speed sensors 24~27 for the four wheels 1~4.

C2. Calculation of Angular Speeds and Angular Accelerations of Wheels

The second sub-step is to calculate the rotational angular speeds (or spin velocities) $\omega_1 \sim \omega_4$, and angular accelerations $(d/dt)\omega_1 \sim (d/dt)\omega_4$ of the wheels 1~4 according to the following equations by using the sensed individual wheel speeds $VW_1 \sim VW_4$ and a wheel rolling radius R.

$$\omega_i = VW_i/R \quad (9)$$

$$(d/dt)\omega_i = s \cdot \omega_i \quad (10)$$

where i is any whole number from 1 to 4, and s is the Laplace operator.

C3. Reading of Engine Speed and Throttle Opening

The brake controller 19 reads the engine speed Ne (rpm) sensed by the sensor 15, and the engine throttle opening (degree) TVO sensed by the sensor 16 via the engine controller 17.

C4. Calculation of Engine Output Torque

Figure 5:
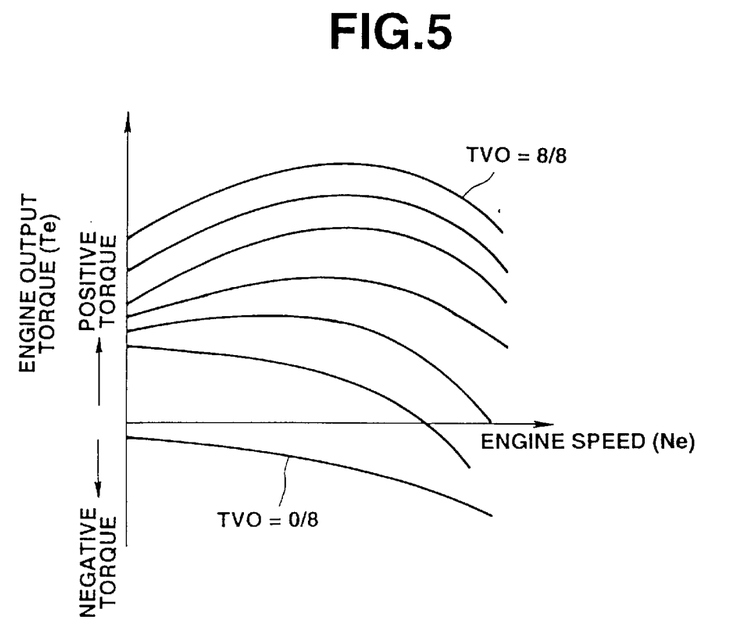
FIG. 5 is a graph showing a characteristic used in the embodiment to determine an engine output torque.

From the engine speed Ne and the throttle opening TVO obtained by the previous sub-step, the brake controller 19 determines an engine output torque Te according to a map which, in this example, corresponds to engine operating characteristics shown in FIG. 5.

C5. Calculation of Transmission Ratio

The brake controller 19 reads the gear position signal indicative of the selected gear position g of the automatic transmission 6 from the transmission controller 18, and determines the transmission ratio (or speed ratio) $\lambda$ in accordance with the gear position signal.

C6. Calculation of Axle Driving Torque

The brake controller 19 calculates an axle driving torque TD transmitted toward the driving wheels (i.e. the rear wheels 3 and 4 in this example) by multiplication of the engine output torque Te and the transmission ratio $\lambda$. That is; $T_D = Te \cdot \lambda$.

C7. Calculation of Individual Driving Torques

The axle driving torque $T_D$ is divided by the differential 7 between the left and right driving wheels 3 and 4. The differential 7 of this example is a standard differential as distinguished from a limited slip differential. The differential 7 of the standard type equally divides the input driving torque $T_D$ between the left and right driving wheels 3 and 4. The wheel driving torques $T_{D3}$ and $T_{D4}$ of the left and right driving wheels 3 and 4 are given by; $T_{D3} = T_{D4} = T_D/2$. The drive system of this example does not transmit engine power to the front wheels 1 and 2. Therefore, the driving torques $T_{D1}$ and $T_{D2}$ of the non-driving wheels 1 and 2 are given by; $T_{D1} = T_{D2} = 0$.

C8. Reading of Brake Fluid Pressures

From the brake fluid pressure sensors 20~23 provided, respectively, in the brake hydraulic circuits for the wheels 1~4, the brake controller 19 reads the sensed individual brake fluid pressures $P_1 \sim P_4$ supplied to the wheel cylinders 8~11.

C9. Calculation of Individual Braking Torques

The brake controller 19 calculates the individual wheel braking torques $T_{B1} \sim T_{B4}$ of the wheels 1~4 by multiplying each of the sensed brake pressures $P_1 \sim P_4$ by a corresponding one of constants $K_{B1} \sim K_{B4}$ determined by design specification data items of the brake system.

$$T_{Bi} = K_{Bi} \cdot P_i \quad (11)$$

where i is any whole number from 1 to 4, and $K_{Bi}$ are constants each determined by brake pad material, a pad area, a rotor diameter and other items of a unique one of the wheels 1~4.

C10. Calculation of Individual Wheel Torques

The brake controller 19 calculates individual wheel torques $T_1 \sim T_4$ of the wheels 1~4 by subtracting the braking torque $T_{B1} \sim T_{B4}$ from the driving torque $T_{D1} \sim T_{D4}$ for each wheel.

$$T_i = T_{Di} - T_{Bi} \quad (12)$$

where i is any whole number from 1 to 4.

C11. Calculation of Individual Longitudinal Forces

From the calculated individual wheel torques $T_1 \sim T_4$, and individual angular accelerations $(d/dt)\omega_1 \sim (d/dt)\omega_4$, the brake controller 19 calculates the individual longitudinal (driving or braking) forces $F_1 \sim F_4$ of the wheels 1~4 by using an equation of wheel rotational motion. That is;

$$F_i = [T_i - I \cdot (d/dt)\omega_i]/R \quad (13)$$

where i is any whole number from 1 to 4, I is the moment of inertia of each wheel, and R is the rolling radius of the wheels.

C12. Filtration of Individual Longitudinal Forces

This sub-step is for reducing noises by filtering the calculated individual longitudinal forces $F_1 \sim F_4$ with a first order lag filter approximately similar in effect to the filter of the second sub-step A2 of the step A. The resulting filtered individual longitudinal forces $F_{f1} \sim F_{f4}$ are;

$$F_{fi} = [1/(1+T_F \cdot s)] F_i \quad (14)$$

where i is any whole number from 1 to 4, $T_F$ is a time constant of the first order lag, and s is the Laplace operator.

Step D

The step D is a section for determining a per-unit-wheel-load longitudinal force (or longitudinal force coefficient) of each wheel 1~4 by the following three sub-steps D1, D2 and D3.

Figure 6:
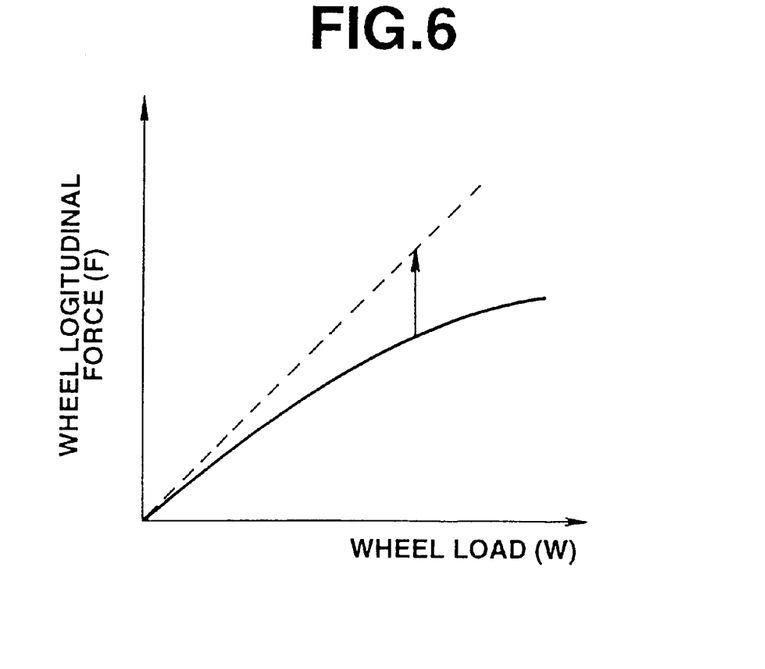
FIG. 6 is a graph showing a nonlinear characteristic of a wheel longitudinal force with respect to a wheel load for determining a wheel load compensating coefficient used in the embodiment.

D1. Retrieval of Wheel Load Dependent Nonlinearity Compensation Coefficient The actual wheel longitudinal force F increases monotonically as the wheel load increases. However, the relationship deviates from an exact proportionality as shown by a solid line in FIG. 6. Therefore, this estimating system employs a nonlinearity compensation coefficient $f_w$ to compensate for the deviation from an ideal linearity shown by a broken line in FIG. 6.

Figure 7:
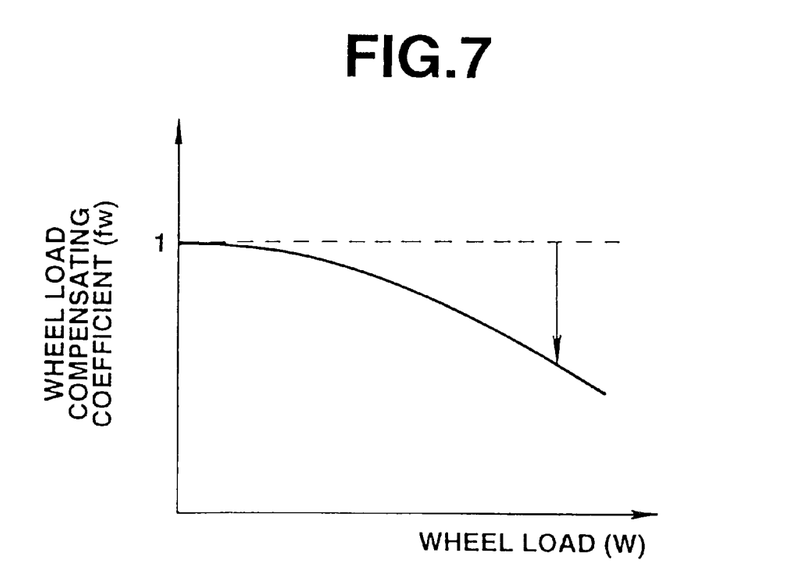
FIG. 7 is a characteristic of the wheel load compensating coefficient used in the embodiment.

FIG. 7 shows a characteristic of the nonlinearity compensation coefficient $f_w$ with respect to the wheel load (W) in this example. The characteristic is preliminarily stored in the memory section. In accordance with a map corresponding to this characteristic, the brake controller 19 retrieves a value of the nonlinearity compensation coefficient $f_{w1} \sim f_{w4}$ corresponding to the wheel load $W_1 \sim W_4$ for each wheel 1~4. In the example shown in FIG. 7, the compensation coefficient fw is equal to or smaller than one and greater than zero, and not linear. The compensation coefficient $f_w$ decreases monotonically as the wheel load W increases.

D2. Retrieval of Wheel Slip Dependent Nonlinearity Compensation Coefficient

Figure 8:
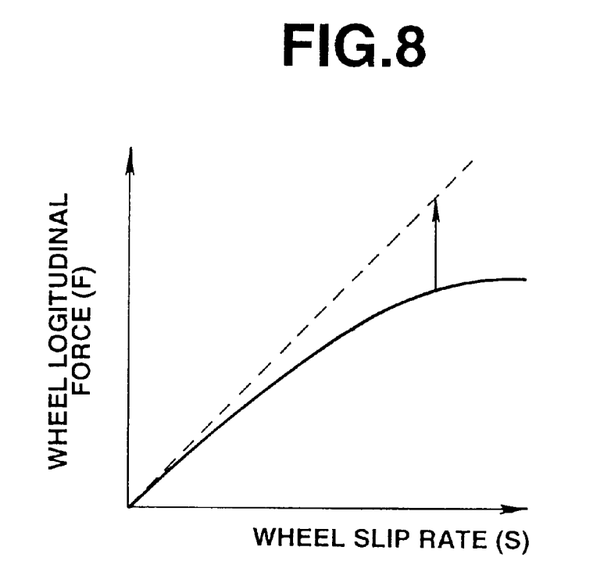
FIG. 8 is a graph showing a nonlinear characteristic of a wheel longitudinal force with respect to a wheel slip rate for determining a slip rate compensating coefficient used in the embodiment.

FIG. 8 shows, by a solid line, the longitudinal force F increasing monotonically with increase in the wheel slip rate S. This relationship is also deviant from the ideal proportionality. Therefore, the estimating system of this example figures in a nonlinearity compensation coefficient $f_s$ to compensate for the deviation from the ideal linearity shown by a broken line in FIG. 8.

Figure 9:
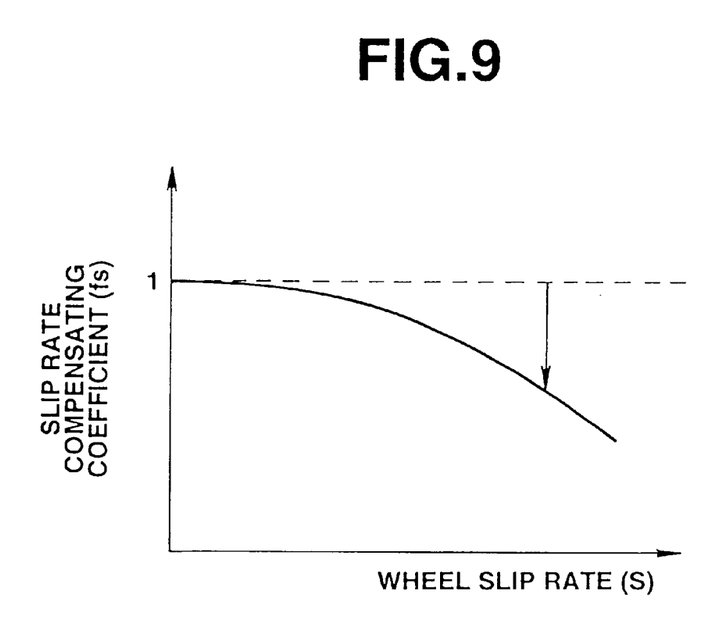
FIG. 9 is a characteristic of the slip rate compensating coefficient used in the embodiment.

FIG. 9 shows a characteristic of the nonlinearity compensation coefficient $f_s$ with respect to the wheel slip (S) in this example. The characteristic is preliminarily stored in the memory section. In accordance with a map corresponding to this characteristic, the estimating system retrieves a value of the nonlinearity compensation coefficient $f_{s1} \sim f_{s4}$ corresponding to a value of the wheel slip rate S for each wheel 1~4.

In this example, the estimating system calculates the individual wheel slip rates S at the step F after the step D, and the wheel slip rates of the current cycle are undecided at the time of the step D. Therefore, the estimating system of this example retrieves values of the nonlinearity compensation coefficients $f_{si}$ by using the previous values $S_i(n-1)$ of the wheel slip rates obtained in the previous operating cycle.

D3. Calculation of Per-Unit-Load Longitudinal Forces

By using the values of the nonlinearity compensation coefficients $f_{w1} \sim f_{w4}$ and $f_{s1} \sim f_{s4}$, the values of the individual wheel loads $W_1 \sim W_4$ obtained in the fourth sub-step B4 of the second step B, and the values of the filtered individual longitudinal forces $F_{f1} \sim F_{f4}$, the brake controller 19 calculates the per-unit-wheel-load longitudinal force $F_{w1} \sim F_{w4}$ for each wheel by:

$$F_{wi}=F_{fi}/(W_i \cdot f_{wi} \cdot f_{si}) \tag{15}$$

where i is any whole number from 1 to 4.

Step E

This step is for estimating the vehicle body speed and the road surface friction coefficient by the following seven sub-steps E1~E7.

E1. Reading of Filtered Wheel Speeds

The brake controller 19 reads the filtered individual wheel speeds $VW_{f1} \sim VW_{f4}$ determined by the second sub-step A2 of the first step A.

E2. Reading of Sensed Steering Angle and Yaw Rate

The brake controller 19 reads the vehicle yaw rate $(d/dt)\phi$ sensed by the sensor 30, and the steering wheel angle $\theta$ sensed by the sensor 31 shown in FIG. 1.

E3. Calculation of Wheel Travel Speed Modification Quantities

In a cornering operation of the vehicle, there arise differences among the wheels in wheel travel speed that is the wheel speed at zero wheel slip. For correction for these differences, the brake controller 19 calculates wheel travel speed modification quantities $\Delta VI_1 \sim \Delta VI_4$ from the sensed yaw rate $(d/dt)\phi$, the sensed steering wheel angle $\theta$ and the sensed lateral acceleration $Y_G$ obtained by the sub-step B1, for example, by using functions $f_{v1} \sim f_{v4}$ which are determined, respectively, for the wheels 1~4, by the wheel base, treads and position of the center of gravity.

In this example, the brake controller 19 calculates the wheel travel speed modification quantities $\Delta VI_1 \sim \Delta VI_4$ from the sensed yaw rate $(d/dt)\phi$, the sensed steering wheel angle $\theta$ and the sensed lateral acceleration $Y_G$ and the sensed longitudinal acceleration $X_G$ obtained by the sub-step B1, by using the following equation:

$$\Delta VI_1=V_L \cdot \theta_F\{\beta_F-(\theta_F/2)\}-(T_F/2)(d/dt)\phi \tag{15A-1}$$

$$\Delta VI_2=V_L \cdot \theta_F\{\beta_F-(\theta_F/2)\}+(T_F/2)(d/dt)\phi \tag{15A-2}$$

$$\Delta VI_3=-(T_R/2)(d/dt)\phi \tag{15A-3}$$

$$\Delta VI_4=(T_R/2)(d/dt)\phi \tag{15A-4}$$

In these equations, $V_L$ is a longitudinal speed of the vehicle, $\beta_F$ is a side slip angle of the vehicle body at the middle of the front axle, $\theta_F$ is a front wheel steer angle, $T_F$ is a front tread between the front wheels 1 and 2, and $T_R$ is a rear tread between the rear wheels 3 and 4. The longitudinal speed $V_L$ is determined from the longitudinal acceleration $X_G$. The side slip angle $\beta_F$ is determined from the direction of motion of the vehicle determined from the lateral and longitudinal accelerations $Y_G$ and $X_G$, and the direction determined from the steering wheel angle sensed by the steering angle sensor 31.

E4. Calculation of Modified Wheel Speeds

The brake controller 19 determines modified wheel speeds $VW_1' \sim VW_4'$ by modifying the filtered wheel speeds $VW_{f1} \sim VW_{f4}$ by the modification quantities $\Delta VI_1 \sim \Delta VI_4$. That is;

$$VW_i'=VW_{fi}-\Delta VI_i \tag{16}$$

where i is any one of 1~4.

E5. Reading of Wheel Selecting Flags

The brake controller 19 reads four wheel selecting flags $FLAG_1 \sim FLAG_4$ for the wheels 1~4. In this example, the wheel selecting flags $FLAG_1 \sim FLAG_4$ are determined in the next step F. The estimating system of this example, therefore, uses the previous values of the wheel selecting flags $FLAG_1 \sim FLAG_4$ determined in the previous operating cycle.

E6. Estimation of Vehicle Body Speed and Road Surface Friction Coefficient

Figure 10:
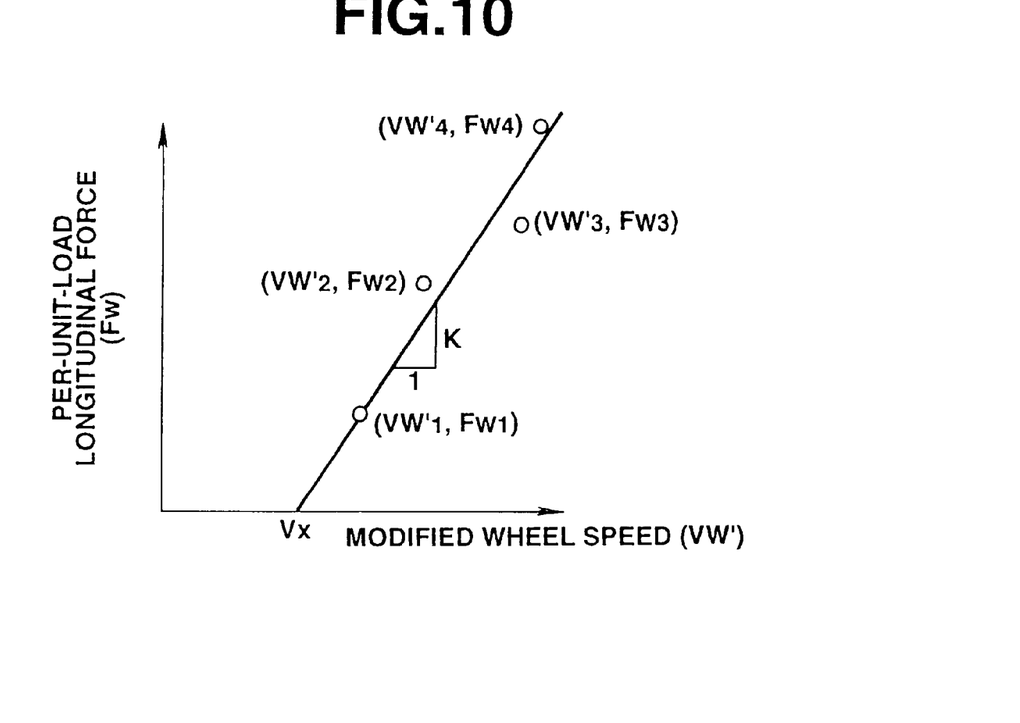
FIG. 10 is a graph showing a set of points corresponding to a set of coordinate pairs of wheel speed value and per-unit-load longitudinal force value, and a line closely fit to the points and used to estimate a vehicle body speed and friction coefficient in the embodiment.

The brake controller 19 checks each of the wheel selecting flag (or condition code) $FLAG_1 \sim FLAG_4$ of each wheel 1~4 to determine whether the flag is equal to 1 or not. Thus, the set of the wheels 1~4 is divided into a selected subset and an unselected subset. Each of the wheels 1~4 is an element of the selected subset if its selecting flag is one, and an element of the unselected subset if its flag is zero. The brake controller 19 forms a numerical data pair of the values of the modified wheel speed $VW_i'$ and the per-unit-load longitudinal force $F_{wi}$ for each wheel of the selected subset. As shown in FIG. 10, the numerical data pair of each wheel of the selected subset is plotted as a point in the plane of the two dimensional coordinate system having the first (horizontal) coordinate axis representing the first variable and the second (vertical) coordinate axis representing the second variable. In this example, the first variable is the modified wheel speed VW', and the horizontal axis has calibrations for measuring the modified wheel speed VW'. The second variable is the per-unit-load longitudinal force Fw, and the second (vertical) coordinate axis has calibrations for the per-unit-load longitudinal force Fw.

Then, the estimating system finds a straight or curved regression line (or regression curve) representing the points plotted in the coordinate system. In the example of FIG. 10, the regression function is linear, and the regression line is a straight line.

As mentioned before with reference to FIG. 3, the wheel speed value at the intercept point at which the linear regression line intersects the horizontal axis represents the vehicle body speed Vx. The inclination angle between the regression line and the horizontal axis (determined by the regression coefficient) represents the vehicle's driving stiffness k from which the estimating system can estimate the road surface friction coefficient $\mu$ as shown in FIG. 4. From these parameters of the regression function, the estimating system estimates the vehicle body speed Vx and the road surface friction coefficient $\mu$.

In this example, the estimating system determines the vehicle body speed Vx and driving stiffness k by using the known least squares method. The driving stiffness k and vehicle body speed Vx are expressed as;

$$k=[n\Sigma(VW_i' \times F_{wi})-\Sigma VW_i' \times \Sigma F_{wi}]/[n\Sigma(VW_i')^2-(\Sigma VW_i')^2] \quad (17)$$

$$Vx=[\Sigma VW_i' \cdot \Sigma(VW_i' \times F_{wi})-\Sigma(VW_i')^2 \cdot \Sigma F_{wi}]/[n\Sigma(VW_i' \times F_{wi})-\Sigma VW_i' \times \Sigma F_{wi}] \quad (18)$$

In these equations, i is any one of 1~4.

E7. Estimation Delay Correction of Vehicle Body Speed

Each of the thus-calculated driving stiffness k and vehicle body speed Vx involves a delay of dead time caused by the operations for filtering the sensed wheel speeds and calculated longitudinal forces, so that there arises a slight shift between the result of the calculation and the actual current value. The estimating system of this example employs the driving stiffness k calculated by the equation (17) without modification because the driving stiffness k is not a rapidly changing variable and the dead time delay offers no practical problem. However, the estimating system corrects the calculated vehicle body speed Vx in the following manner.

Figure 11:
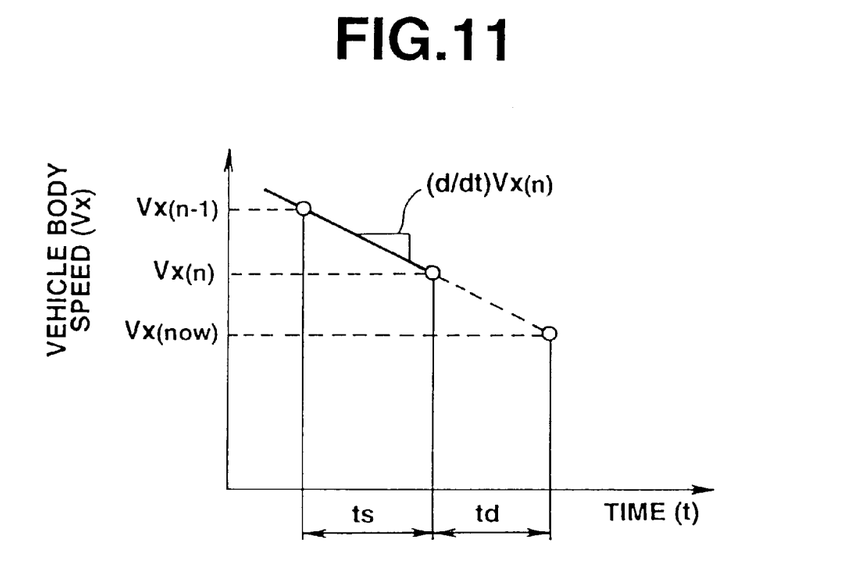
FIG. 11 is a time chart showing a dead time quantity td used in the embodiment.

As shown in FIG. 11, the calculated vehicle body speed Vx(n) resulting from the calculation of the equation (18) is delayed with respect to a current vehicle body speed Vx(now) by a dead time delay td caused by the filtering operations.

On the assumption that the time rate of change (d/dt)Vx(n) of the vehicle body speed is constant as shown by a broken line in FIG. 11, the estimating system of this example calculates the current vehicle body speed Vx(now) and the time rate of change (d/dt)Vx(n) of the vehicle body speed by the following equations;

$$Vx(\text{now})=Vx(n)+td \cdot (d/dt)Vx(n) \quad (19)$$

$$(d/dt)Vx(n)=[(Vx(n)-Vx(n-1)]/ts \quad (20)$$

where ts is a sampling period.

Step F

The sixth process step F is a wheel selecting step to rule out the wheel speed data and per-unit-load longitudinal force data tending to aggravate the error in estimation of the vehicle body speed and road friction parameter. The step F includes the following three sub-steps F1, F2 and F3.

F1. Calculation of Wheel Travel Speeds

From the vehicle body speed Vx obtained by the seventh sub-step E7 of the step E and the wheel travel speed modification quantities $\Delta VI_1 \sim \Delta VI_4$ of the wheels 1~4 obtained by the third sub-step E3 of the step E, the brake controller 19 calculates the individual wheel travel speeds $VI_1 \sim VI_4$ by;

$$VI_i = Vx + \Delta VI_i \quad (21)$$

where i is any whole number from 1 to 4.

F2. Calculation of Wheel Slip Rates

From the sensed individual wheel speeds $VW_1 \sim VW_4$ obtained by the first sub-step A1 of the step A, and the individual wheel travel speeds $VI_1 \sim VI_4$ obtained by the preceding sub-step, the brake controller 19 calculates the individual wheel slip rates $S_1 \sim S_4$ of the wheels 1~4 by;

$$S_i=[(VW_i-VI_i)/VI_i] \times 100\% \quad (22)$$

where i is any whole number from 1 to 4.

F3. Setting of Wheel Selecting Flags

As mentioned before with reference to FIG. 3A, the road surface friction coefficient $\mu$ (the wheel longitudinal force) varies linearly with increase in the wheel slip rate S in the linear region where the slip rate S is equal to or lower than the predetermined level So. The estimation of the vehicle body speed and road surface friction parameter is accurate when the estimation is based on data on the operating conditions of the wheels which are in the linear region.

To maintain the accuracy, the estimating system of this example excludes the data of each wheel by setting the wheel selecting flag to zero if the absolute value of the wheel slip rate S of the given wheel exceeds the preset level So. In this sub-step, the brake controller 19 sets the wheel selecting flag (or condition code) $FLAG_1 \sim FLAG_4$ of each wheel to one if the absolute value of the wheel slip rate S of that wheel is equal to or lower than the predetermined value So ($|S| \leq So$). The wheel selecting flag $FLAG_1 \sim FLAG_4$ of each wheel is set to zero if the absolute value of the wheel slip rate S of that wheel is greater than the predetermined value So ($|S| > So$).

The wheel selecting flags $FLAG_1 \sim FLAG_4$ are checked in the fifth sub-step E5 of the step E, and each of the wheels 1~4 is entered in either of the selected subset and the unselected subset. Each wheel cannot belong to both subsets simultaneously. Each of the selected and unselected subsets is the complement of the other in the wheel set. The estimating system estimates the vehicle body speed and friction parameter using the data of the selected subset and disregarding the data of the unselected subset. In the example shown in FIG. 10, the cardinal number of the selected subset is four and the unselected subset is empty.

In the thus-constructed estimating system, the brake controller (or estimating unit) 19 selects the wheels not slipping excessively by checking the wheel selecting flags $FLAG_1 \sim FLAG_4$, and finds a straight line of regression best fit to a set of points determined by the data pair of the wheel speed $VW_i'$ and the per-unit-load longitudinal force $F_{wi}$ of each of the selected wheels in the rectangular plane coordinate system as shown in FIG. 10. Then, the brake controller 19 determines the driving stiffness k and the vehicle body speed Vx from the slope and intercept of the straight line, and determines the absolute road surface friction coefficient $\mu$ from the driving stiffness by using the map corresponding to the characteristic shown in FIG. 4.

By using the thus-estimated vehicle body speed Vx and road friction coefficient $\mu$, the brake controller 19 of this example performs the anti skid brake control of a known type by sending brake control signals indicative of desired brake fluid pressures for the individual wheels 1~4 to the brake fluid control actuator 14. In response to the control signals, the brake fluid control actuator 14 controls the brake fluid pressures P1~P4 individually so as to reduce the deviation from the desired value. In this way, the brake control system can prevent the wheel locking during braking, and attain the highest braking efficiency.

The estimation system according to the illustrated embodiment of the present invention can properly estimate the vehicle body speed and road surface friction coefficient at all times, irrespective of whether the vehicle is a two wheel drive type or a four wheel drive type, and irrespective of whether the brakes are being applied or not.

The estimating system does require neither a temporary braking operation nor a temporary brake releasing operation for a specified wheel. Therefore, the result of the estimation is free from undesired hunting, the accuracy in the estimation is high and the anti skid brake control performance is improved.

Moreover, the estimating system according to the embodiment of the present invention is advantageous in speed of estimation and structure of the system as compared with the estimating system of the neural network type.

Without the need for a sensor susceptible to an undesired drift, the estimating system according to the embodiment is simple, uncostly and accurate.

The selection of the wheels by checking the wheel slip rate can improve the accuracy of the estimation. With the slip level So set equal to the upper limit of the slip rate in the linear range for selecting the wheels, the estimating system can improve the accuracy of estimation by collecting all the appropriate data, and removing the inappropriate data of wheels slipping in the nonlinear region.

The estimating system of this embodiment calculates the longitudinal driving or braking force in the eleventh sub-step C11 of the step C, from the wheel torque Ti and the wheel angular acceleration $(d/dt)\omega$ according to the equation obtained by applying the Newton's second law to a rotational system of a wheel. Therefore, the system can avoid the complexity, difficulty and inaccuracy involved in the technique of directly sensing the wheel longitudinal force.

The estimating system of this embodiment employs at least one drive or power system condition sensor, such the engine speed sensor 15, and the throttle position sensor 16, to determine the wheel driving torques $T_{Di}$, and the brake condition sensors in the form of the brake pressure sensors 20~23 to determine the wheel braking torques $T_{Bi}$. The estimating unit in the form of the brake controller 19 determines the wheel torques $T_i$ by subtracting the braking torque from the driving torque. The brake controller 19 can readily determine the engine torque Te by using the map as shown in FIG. 5, the calculation of the transmission ratio $\lambda$ is easy, and the brake pressure sensors 20~23 can readily sense the brake pressures. Therefore, the estimating system according to the illustrated embodiment can compute the wheel torques $T_i$ without difficulty and without increasing the cost.

The use of the wheel load dependent nonlinearity compensating coefficient $f_w$ shown in FIG. 7 and/or the wheel slip dependent nonlinearity compensating coefficient $f_s$ shown in FIG. 9 can further improve the accuracy of estimation.

The filtering operation for the sensed wheel speed in the sub-step A2 of the step A, and the filtering operation for the longitudinal force in the sub-step C12 can further improve the accuracy of estimation by removing noise.

The estimation delay correction of the vehicle body speed in the sub-step E7 can improve the accuracy in estimating the vehicle body speed.

In the present invention, it is possible to replace the step B by the following modified step B'.

Step B'

B'1 Calculation of Suspension Stroke Quantities and Suspension Stroke Speed

The brake controller 19 reads the suspension stroke quantities $L_1$~$L_4$ sensed by the group of the suspension stroke sensors 32 of the individual wheels 1~4, and calculates the suspension stroke speeds $(d/dt)L_1$~$(d/dt)L_4$ by;

$$(d/dt)L_i = [(L_i(n) - L_i(n-1)]/ts \quad (23)$$

where $L_i(n)$ are current values of the sensed suspension stroke quantities, $L_i(n-1)$ are previous values of the sensed suspension quantities, ts is an operating cycle, and i is any whole number from 1 to 4.

B'2 Calculation of Spring Related Wheel Load Components

Figure 12:
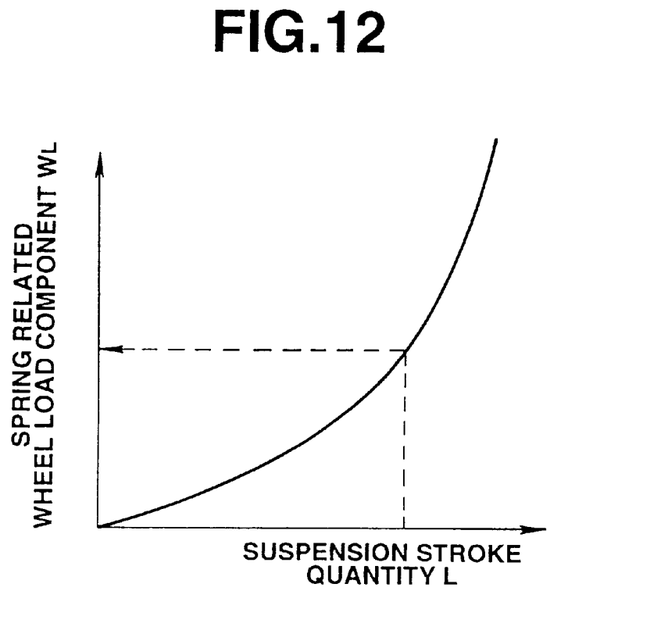
FIG. 12 is a graph showing a characteristic used to determine a spring component WL of a wheel load from a suspension stroke quantity in the embodiment.

From the individual suspension stroke quantities $L_1$~$L_4$ of the wheels 1~4, the brake controller 19 determines individual spring related wheel load components $W_{L1}$~$W_{L4}$ by information retrieval using the characteristic of the spring related wheel load component $W_L$ versus the suspension stroke quantity L as shown in FIG. 12.

B'3 Calculation of Shock Related Wheel Load Components

Figure 13:
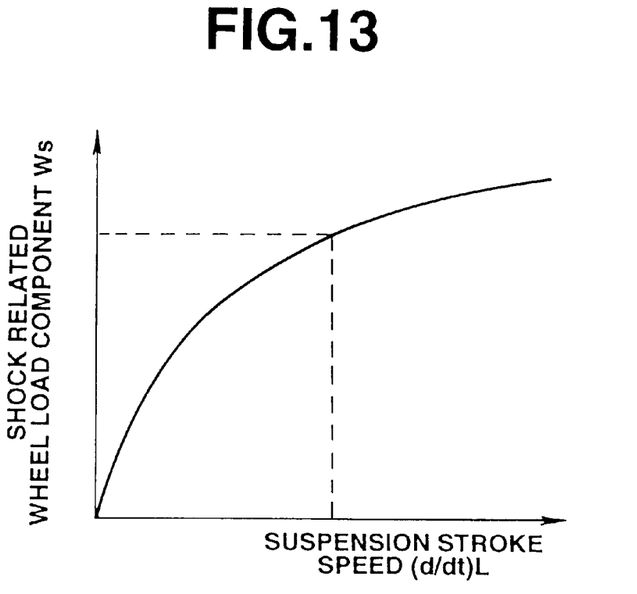
FIG. 13 is a graph showing a characteristic used to determine a shock component of the wheel load from a suspension stroke speed in the embodiment.

From the individual suspension stroke speeds $(d/dt)L_1$~$(d/dt)L_4$ of the wheels 1~4, the brake controller 19 determines individual shock (or damper) related wheel load components $W_{S1}$~$W_{S4}$ by information retrieval using the characteristic of the shock related wheel load component Ws versus the suspension stroke speed $(d/dt)L$ as shown in FIG. 13.

B'4 Calculation of Wheel Loads

The brake controller 19 determines the individual wheel loads $W_1$~$W_4$ of the wheels 1~4 by addition of each of the spring related load components $W_{L1}$~$W_{L4}$ and a corresponding one of the shock related load components $W_{S1}$~$W_{S4}$.

By this step B', the estimating system according to the present invention can determine the individual wheel loads readily, uncostly and reliably while the vehicle is in motion.

In the present invention, it is possible to replace the step D by the following modified step D'.

Step D'

Figure 14A:
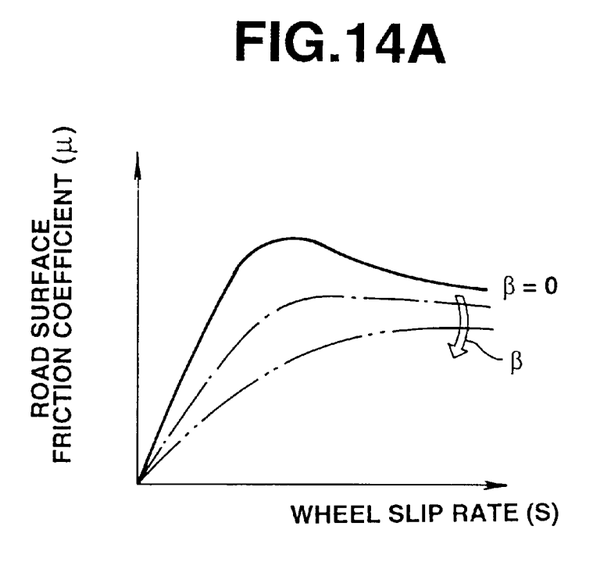
FIG. 14A is a graph showing a characteristic of a road surface friction coefficient versus a wheel side slip angle, used to determine a side slip angle compensating coefficient according to the present invention.

As shown in FIG. 14A, the characteristic of the road surface friction coefficient $\mu$ with respect to the wheel slip rate S is influenced by the wheel side slip angle $\beta$. The road surface friction coefficient $\mu$ (the longitudinal driving or braking force) decreases as the wheel side slip angle $\beta$ increases. The step D' is designed to compensate for this influence.

D1. Retrieval of Wheel Load Dependent Nonlinearity Compensation Coefficient

The first sub-step of the step D' is the same as the first sub-step D1 of the step D.

D2. Retrieval of Wheel Slip Dependent Nonlinearity Compensation Coefficient

The second sub-step of the step D' is the same as the second sub-step D2 of the step D.

D'2a Retrieval of Side Slip Dependent Compensation Coefficient

Figure 14B:
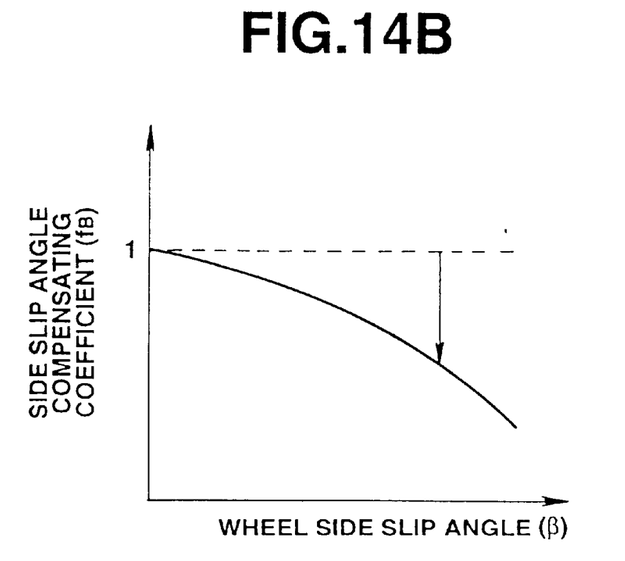
FIG. 14B is a graph showing a characteristic of the side slip angle compensating coefficient versus the wheel side slip angle according to the present invention.

The estimating system of this example employs a predetermined side slip dependent compensating coefficient $f_B$ shown in FIG. 14B for compensating for the influence of the wheel side slip angle $\beta$ on the wheel longitudinal driving or braking force. The side slip dependent compensating coefficient $f_B$ is a function of the wheel side slip angle $\beta$. This function is preliminarily determined by the characteristics of tires of the wheels.

The individual wheel side slip angles $\beta_1$~$\beta_4$ of the wheels 1~4 are determined from the vehicle body speed Vx (the previous value of Vx), the lateral acceleration $Y_G$, the yaw rate $(d/dt)\phi$ and the steering wheel angle $\theta$. From the individual wheel side slip angles $\beta_1$~$\beta_4$, the brake controller 19 determines individual side slip dependent compensating coefficients $f_{B1} \sim f_{B4}$, respectively, corresponding to the wheel side slip angles $\beta_1 \sim \beta_4$ by information retrieval using the map corresponding to the characteristic of FIG. 14B. As shown in FIG. 14B, the side slip dependent coefficient $f_B$ decreases from 1 toward zero as the wheel side slip angle $\beta$ increases.

D'3. Calculation of Per-Unit-Load Longitudinal Forces

By using the values of the compensation coefficients $f_{W1} \sim f_{W4}$, $f_{S1} \sim f_{S4}$ and $f_{B1} \sim f_{B4}$, the values of the individual wheel loads $W_1 \sim W_4$ obtained in the fourth sub-step B4 of the second step B (or the sub-step B'4 of the step B'), and the filtered individual longitudinal forces $F_{f1} \sim F_{f4}$, the brake controller 19 calculates the per-unit-wheel-load longitudinal forces $F_{w1} \sim F_{w4}$ for the wheels by:

$$F_{wi} = F_{fi}/(W_i \cdot f_{Wi} \cdot f_{Si} \cdot f_{Bi}) \quad (24)$$

where i is any whole number from 1 to 4.

The use of the side slip dependent compensating coefficients further improves the accuracy of estimation by reducing the error caused by the influence of the side slip angle.

In the illustrated example, each of the engine controller 17, transmission controller 18 and brake controller 19 comprises an onboard computer.

What is claimed is:

1. A system for estimating a vehicle operating variable of a vehicle provided with a set of road wheels, the system comprising:

a sensor group for sensing vehicle operating conditions of the vehicle to determine values of wheel speed, wheel load and wheel longitudinal force of each wheel of at least two of the road wheels; and an estimating unit for determining a relationship among the wheel speed, wheel load and wheel longitudinal force in accordance with the values of the wheel speed, load and longitudinal force and for estimating the vehicle operating variable from the relationship, the vehicle operating variable being one of a body speed and a road surface friction coefficient;

wherein the estimating unit is configured to determine a value of a per-unit-load longitudinal force by dividing the value of the wheel longitudinal force by the value of the wheel load for each wheel, to form a data pair of the values of the per-unit-load longitudinal force and wheel speed of each of said at least two of the road wheels, to identify a regression line from a plurality of the data pairs, and to estimate the vehicle operating variable from the regression line.

2. A system according to claim 1 wherein the regression line is a line representing data points in a two dimensional coordinate system having a first coordinate axis representing the wheel speed and a second coordinate axis representing the per-unit-load longitudinal force, each data point is determined by a unique one of the data pairs, the estimating unit is configured to estimate the vehicle body speed from an intercept of the regression line on the first coordinate axis and to estimate the road surface friction coefficient from a gradient of the regression line with respect to the first axis.

3. A system according to claim 2 wherein the estimating unit is configured to determine a wheel slip rate of each of the road wheels of the vehicle, to determine whether the slip rate of each wheel is within a predetermined slip range, and select each wheel if the wheel has the slip rate within the predetermined range.

4. A system according to claim 3 wherein the predetermined slip range is a linear range in which a relationship between the wheel longitudinal force and the wheel slip rate is substantially linear.

5. A system according to claim 1 wherein the sensor group comprises a longitudinal acceleration sensor for sensing a longitudinal acceleration of the vehicle, and a lateral acceleration sensor for sensing a lateral acceleration of the vehicle, and wherein the estimating unit is configured to calculate a value of a load transfer quantity of each wheel in accordance with the longitudinal acceleration and the lateral acceleration, and to determine the value of the wheel load by an algebraic addition of the load transfer quantity and an initial wheel load for each wheel.

6. A system according to claim 1 wherein the sensor group comprises suspension condition sensors for sensing a suspension condition of each road wheel, and the estimating unit is configured to determine values of a suspension stroke quantity and a suspension stroke speed of each road wheel in accordance with the suspension conditions, further to determine a value of a spring component in accordance with the value of the suspension stroke quantity for each wheel and a value of a shock component in accordance with the value of the suspension stroke speed for each wheel, and to determine the value of the wheel load by addition of the values of the spring and shock components for each wheel.

7. A system according to claim 1 wherein the estimating unit is configured to determine values of a wheel torque and an angular acceleration of each road wheel, and to further determine the value of the wheel longitudinal force of each wheel from the wheel torque and angular acceleration by using an equation of wheel rotational motion.

8. A system according to claim 7 wherein the sensor group comprises sensors for determining an engine output toque of an engine of the vehicle, a transmission ratio of a transmission of the vehicle, and a brake application force of each road wheel, and the estimating unit is configured to determine a driving torque in accordance with the engine output torque and the transmission ratio, and a braking torque of each road wheel in accordance with the brake application force, and to determine the wheel torque of each road wheel by subtraction between the driving torque and the braking torque.

9. A system according to claim 1 wherein the per-unit-load longitudinal force is determined according to an equation comprising a compensating quantity for compensating for a nonlinearity between the wheel load and the wheel longitudinal force.

10. A system according to claim 1 wherein the per-unit-load longitudinal force is determined according to an equation comprising a compensating quantity for compensating for a nonlinearity between a wheel slip rate and the longitudinal force.

11. A system according to claim 1 wherein the per-unit-load longitudinal force is determined according to an equation comprising a compensating quantity for compensating for an influence of a wheel side slip angle on the wheel longitudinal force.

12. A system according to claim 1 wherein the estimating unit is configured to determine, for each wheel, a value of a modification quantity which is a difference between the vehicle body speed and a wheel travel speed corresponding to the wheel speed in a state free from a wheel slip, further to determine a modified wheel speed value by modifying the value of the wheel speed by the value of the modification quantity for each wheel, and to determine the relationship among the wheel speed, wheel load and wheel longitudinal force by using the modified wheel speed values in addition to the values of the wheel load and longitudinal force.

13. A system according to claim 2 wherein the estimating unit is configured to determine sensed wheel speed value and sensed longitudinal force value of each wheel from signals from the sensor group, further to determine a filtered wheel speed value by filtering the sensed wheel speed value, and a filtered longitudinal force value by filtering the sensed longitudinal force value for each wheel and to estimate the vehicle operating variable by using the filtered wheel speed values and the filtered longitudinal force values.

14. A system according to claim 13 wherein the estimating unit is configured to modify an estimated vehicle body speed by using a dead time quantity for taking account of a dead time due to a filtering operation.

15. A system according to claim 1 wherein the estimating unit is configured to determine, for each wheel, a value of a modification quantity in accordance with a lateral acceleration of the vehicle, a longitudinal acceleration of the vehicle, a yaw rate of the vehicle, and a steering angle of the vehicle, to determine a modified value of the wheel speed for each wheel by modifying the wheel speed in accordance with the modification quantity, and to determine the relationship by using the modified values of the wheel speed.

16. A system according to claim 15 wherein the set of wheels of the vehicle comprises first and second front wheels and first and second rear wheels, and the modification quantities of the front and rear wheels are determined by;

$$\Delta VI_1 = V_L \cdot \theta_F \{\beta_F - (\theta_F/2)\} - (T_F/2)(d/dt)\phi$$

$$\Delta VI_2 = V_L \cdot \theta_F \{\beta_F - (\theta_F/2)\} + (T_F/2)(d/dt)\phi$$

$$\Delta VI_3 = -(T_{R/2})(d/dt)\phi$$

$$\Delta VI_4 = (T_{R/2})(d/dt)\phi$$

where $\Delta VI_1$ and $\Delta VI_2$ are the modification quantities of the first and second front wheels, $\Delta VI_3$ and $\Delta VI_4$ are the modification quantities of the first and second rear wheels, $T_F$ is a front tread between the front wheels, and $T_R$ is a rear tread between the rear wheels, $V_L$ is a longitudinal speed of the vehicle determined from the longitudinal acceleration, $\beta_F$ is a side slip angle of a vehicle body at a middle of a front axle determined in accordance with the lateral and longitudinal accelerations and, and $\theta_F$ is a front wheel steer angle.

17. A system according to claim 16:
wherein the estimating unit is configured to determine a travel speed of each wheel by adding the modification quantity to the vehicle body speed estimated from the relationship, to determine a wheel slip rate for each wheel from the wheel speed and the travel speed, to compare an absolute value of the wheel slip rate for each wheel with a preset level, and to exclude each wheel in determining the relationship if the absolute value of the wheel slip rate is greater than the preset level, the wheel slip rate being proportional to a fraction whose numerator is a difference between the wheel speed and the travel speed and whose denominator is equal to the travel speed; and
wherein the sensor group comprises a longitudinal acceleration sensor for sensing the longitudinal acceleration of the vehicle, a lateral acceleration sensor for sensing the lateral acceleration of the vehicle, a yaw rate sensor for sensing the yaw rate of the vehicle, and a steering angle sensor for sensing a steering operation of the vehicle to determine the front wheel steer angle.

18. A system according to claim 1:
wherein the sensor group comprises a first sensor subgroup for determining a value of the wheel speed of each wheel, a second sensor subgroup for determining a value of the wheel load of each wheel and a third sensor subgroup for determining values of wheel driving torque and wheel braking torque of each wheel; and
wherein the estimating unit calculates the value of the wheel longitudinal force by subtraction between the driving torque and braking torque for each wheel, further calculates, for each wheel, a per-unit-load longitudinal force which is proportional to a fraction whose numerator comprises the wheel longitudinal force and whose denominator comprises the wheel load, forms a data pair of the values of the wheel speed and per-unit-load longitudinal force of each wheel, statistically determines the relationship between the wheel speed and the per-unit-load longitudinal force from the data pairs of the wheels, and estimates the vehicle operating variable from the relationship.

19. A system according to claim 18 wherein the relationship is a regression function determined from the data pairs by a least squares method, and the estimating unit estimates the vehicle body speed and the road surface friction coefficient from a regression coefficient of the regression function.

20. A system according to claim 19 wherein the system further comprises a vehicle control actuator for controlling a behavior of the vehicle in response to a control signal, and the estimating unit comprises an onboard computer for producing the control signal in accordance with the vehicle operating variable.

21. A system according to claim 1 wherein the wheel longitudinal force is a driving force when a driving torque about a wheel spin axis is greater than a braking torque, and is a braking force when the driving torque is smaller than the braking torque; wherein the sensor group comprises wheel speed sensors for sensing individual wheel speeds of the wheels, brake sensors for sensing individual braking conditions of the wheels to determine individual braking torques of the wheels, and a drive system condition sensor for sensing an operating condition of a drive system comprising an engine of the vehicle to determine individual driving torques of the wheels; and wherein the estimating unit determines the wheel torque in accordance with the driving torque and braking torque and the wheel longitudinal force in accordance with the wheel torque and a wheel angular acceleration.

22. A system for estimating a vehicle operating variable of a vehicle, the system comprising:
a sensor group for sensing vehicle operating conditions to determine values of a wheel speed, a wheel load and a wheel longitudinal force of each of wheels of the vehicle; and
an estimating unit for determining a value of a per-unit-load longitudinal force of each of the wheels, for forming a data pair of the values of the wheel speed and the per-unit-load longitudinal force of each of the wheels, for identifying a regression line from at least two of the data pairs, and for estimating the vehicle operating variable from the regression line, the vehicle operating variable being one of a vehicle body speed and a road surface friction coefficient, the per-unit-load longitudinal force being determined in accordance with a quotient obtained by dividing the wheel longitudinal force by the wheel load.

23. A process for estimating a vehicle operating variable of a vehicle provided with a set of wheels, comprising:
a preparing step of determining values of wheel speed, wheel load and wheel longitudinal force of each wheel;
an estimating step of estimating the vehicle operating variable by analyzing the values of the wheel speed, load and longitudinal force, the vehicle operating variable being one of a vehicle body speed and a road surface friction coefficient;

wherein the estimating step comprises a step of assigning each wheel uniquely a coordinate pair of a value of a first variable and a value of a second variable, determining a functional relationship between the first and second variables in accordance with a plurality of the coordinate pairs of the wheels, determining a value of the first variable corresponding to a zero value of the second variable according to the relationship and a rate of increase of the second variable with respect to the first variable according to the relationship, and estimating the vehicle body speed from the value of the first variable corresponding to the zero value of the second variable, and the friction coefficient from the rate of increase of the second variable with respect to the first variable, the first variable being indicative of the wheel speed, the second variable being indicative of a ratio of the wheel longitudinal force to the wheel load;

wherein the preparing step comprises, a wheel longitudinal force determining step of determining a calculated driving torque value and a calculated braking torque value of each wheel and determining a calculated longitudinal force value by subtraction between the calculated driving torque value and braking torque value for each wheel, and a per-unit-load longitudinal force determining step of determining a calculated per-unit-load longitudinal force value by dividing the longitudinal force value by the wheel load value of each wheel, the value of the second variable being determined from the per-unit-load longitudinal force value for each wheel; and wherein the process further comprises a selecting step of determining a wheel slip rate of each wheel and disregarding the coordinate pair of each wheel in determining the relationship if the wheel slip rate is in a predetermined range.

* * * * *